US008835759B1

(12) United States Patent  
Escobar et al.

(10) Patent No.: US 8,835,759 B1  
(45) Date of Patent: Sep. 16, 2014

(54) SUPPORT CONTAINERS AND VEHICLES INCLUDING SAME

(71) Applicant: Honda Motor Co., Ltd., Tokyo (JP)

(72) Inventors: Edgar Arturo Escobar, Dublin, OH (US); Eric Douglas Moseley, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 13/803,169

(22) Filed: Mar. 14, 2013

(51) Int. Cl.  
*H02G 3/08* (2006.01)  
*B60R 9/06* (2006.01)

(52) U.S. Cl.  
CPC ............... *B60R 9/06* (2013.01); *Y10S 248/906* (2013.01)  
USPC ............ 174/50; 174/135; 174/559; 180/68.3; 248/906

(58) Field of Classification Search  
CPC ........................................................ B60R 9/06  
USPC ................ 174/66, 67, 50, 135, 559; 439/535; 248/906; 220/4.02; 180/68.3  
See application file for complete search history.

(56) References Cited

U.S. PATENT DOCUMENTS

| | | | |
|---|---|---|---|
| 5,703,325 A | 12/1997 | Yamaguchi et al. | |
| 5,822,189 A * | 10/1998 | Isshiki | 361/736 |
| 6,069,315 A * | 5/2000 | Tang | 174/50 |
| 6,605,780 B2 | 8/2003 | Chiriku et al. | |
| 7,195,515 B2 | 3/2007 | Kanamaru | |
| 7,247,791 B2 * | 7/2007 | Kulpa | 174/50 |
| 7,622,674 B2 | 11/2009 | Kanamaru et al. | |
| 8,633,383 B2 * | 1/2014 | Akahori et al. | 174/50 |

* cited by examiner

*Primary Examiner* — Dhirubhai R Patel  
(74) *Attorney, Agent, or Firm* — Ulmer & Berne LLP (57) ABSTRACT

A support container includes a base and a lid. The base includes a base wall, a pair of substantially vertical, elongated flanges, and a lower flange. The base wall at least partially defines a receptacle. The lower flange cooperates with the pair of substantially vertical, elongated flanges to define a slot. The lid includes an upper portion, a side wall, and an upper flange. The side wall extends substantially downwardly from the upper portion and defines a pair of substantially vertical, elongated channels. Each of the substantially vertical, elongated flanges extends away from the base wall and the receptacle. When the lid is installed on the base, the side wall substantially covers the slot, the pair of substantially vertical, elongated flanges nests extensively within the pair of substantially vertical, elongated channels, and the lower and upper flanges cooperate with one another to define a conduit for the receptacle.

20 Claims, 8 Drawing Sheets

SUPPORT CONTAINERS AND VEHICLES INCLUDING SAME

TECHNICAL FIELD

A vehicle includes a support container having a lid and a base. The support container facilitates protection of electrical couplers and electrical conductors.

BACKGROUND

Many conventional vehicles, such as saddle-type vehicles, include electrical couplers that facilitate selective connection of a pair of electrical conductors. These electrical couplers are oftentimes located in areas on the vehicle that are prone to exposure to water. As a result, the electrical couplers are often provided as waterproof-type couplers which are expensive and labor intensive to implement.

SUMMARY

In accordance with one embodiment, a support container includes a base and a lid. The base includes a base wall, a pair of substantially vertical, elongated flanges, and a lower flange. The base wall at least partially defines a receptacle. The lower flange cooperates with the pair of substantially vertical, elongated flanges to define a slot. The lid includes an upper portion, a side wall, and an upper flange. The side wall extends substantially downwardly from the upper portion and defines a pair of substantially vertical, elongated channels. The slot defines a centerline that resides in an imaginary plane. Each of the substantially vertical, elongated flanges extends away from the base wall, the receptacle, and the imaginary plane in substantially the same direction. When the lid is installed on the base, the side wall substantially covers the slot, the pair of substantially vertical, elongated flanges of the base nests extensively within the pair of substantially vertical, elongated channels of the side wall of the lid, and the lower flange of the base and the upper flange of the lid cooperate with one another to define a conduit for the receptacle.

In accordance with another embodiment, a support container includes a base and a lid. The base includes a base wall, a pair of substantially vertical, elongated flanges, and a lower flange. The base wall at least partially defines a receptacle. The lower flange cooperates with the pair of substantially vertical, elongated flanges to define a slot. The lid includes an upper portion, a side wall, and an upper flange. The side wall extends substantially downwardly from the upper portion and defines a pair of substantially vertical, elongated channels. The slot defines a centerline that resides in an imaginary plane. Each of the substantially vertical, elongated flanges extends away from the base wall, the receptacle, and the imaginary plane in substantially the same direction. When the lid is installed on the base, the side wall substantially covers the slot and the pair of substantially vertical, elongated flanges of the base nests extensively within the pair of substantially vertical, elongated channels of the side wall of the lid. The side wall of the lid abuts the base wall. The side wall includes a peripheral edge, the base wall defines a groove, and the peripheral edge extends into the groove when the lid is installed on the base. The lid further includes a flange extending substantially downwardly from the upper portion and configured for selective engagement with the base wall when the lid is installed on the base. The lower flange of the base and the upper flange of the lid cooperate with one another to define a conduit for the receptacle. Each of the upper and lower flanges is substantially semi-cylindrically shaped and includes a respective pair of circumferential ends. The circumferential ends of the upper flange extend over the circumferential ends of the lower flange when the lid is installed on the base.

In accordance with yet another embodiment, a vehicle includes a frame, a base, and a lid. The frame includes a support bracket. The base is coupled to the support bracket and includes a base wall, a pair of substantially vertical, elongated flanges, and a lower flange. The base wall at least partially defines a receptacle. The lower flange cooperates with the pair of substantially vertical, elongated flanges to define a slot. The lid includes an upper portion, a side wall, and an upper flange. The side wall extends substantially downwardly from the upper portion and defines a pair of substantially vertical, elongated channels. The slot defines a centerline that resides in an imaginary plane. Each of the substantially vertical, elongated flanges extends away from the base wall and the receptacle. When the lid is installed on the base, the side wall substantially covers the slot, the pair of substantially vertical, elongated flanges of the base nests extensively within the pair of substantially vertical, elongated channels of the side wall of the lid, and the lower flange of the base and the upper flange of the lid cooperate with one another to define a conduit for the receptacle.

BRIEF DESCRIPTION OF THE DRAWINGS

It is believed that certain embodiments will be better understood from the following description taken in conjunction with the accompanying drawings in which.

DETAILED DESCRIPTION

Embodiments are hereinafter described in detail in connection with the views and examples of FIGS. 1-8, wherein like numbers indicate the same or corresponding elements throughout the views. A vehicle can include a vehicular engine assembly having an engine and an intake assembly that is in fluid communication with the engine. A vehicle 10 is illustrated in FIG. 1 and is depicted as a saddle-type vehicle.

Figure 1:
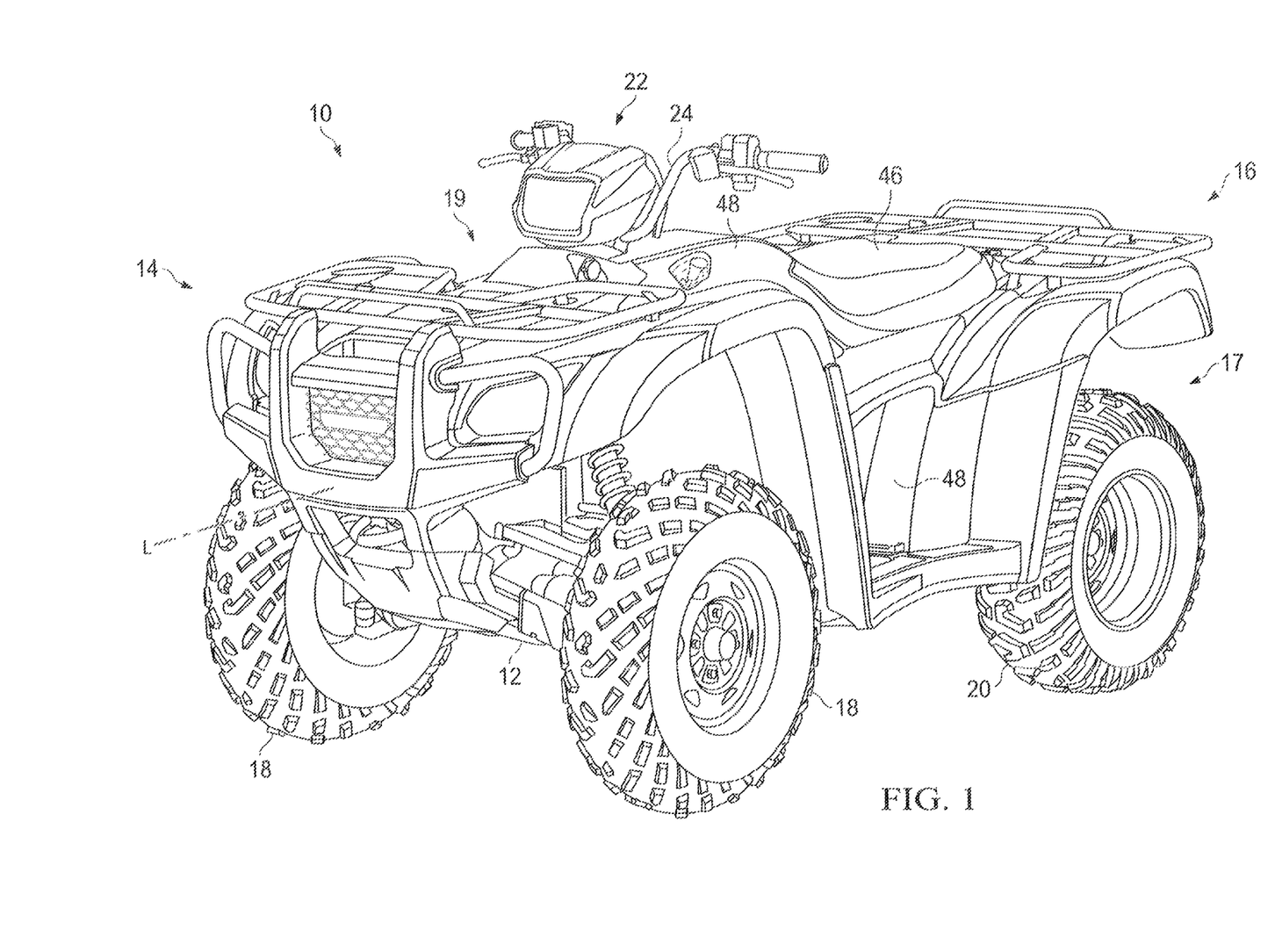
FIG. 1 is a front perspective view of a vehicle in accordance with one embodiment.

A saddle-type vehicle can include an all-terrain vehicle ("ATV" as shown in FIG. 1), a motorcycle, a scooter, a snowmobile, or a personal watercraft, for example. Other suitable vehicles can include, for example, a multi-use vehicle (e.g., a side-by-side utility vehicle), an automobile, a truck, a van, a recreational vehicle, a watercraft, agricultural equipment, construction equipment, or any of a variety of other vehicles. The vehicle 10 can include a frame 12 that can be of a tubular construction or can be provided in any of a variety of other suitable arrangements, such as a unibody construction, for example, and can be formed using any of a variety of materials, such as metal or carbon fiber, for example. As illustrated in FIG. 1, the vehicle 10 can extend along a longitudinal axis L between a front end 14 and a rear end 16 and can extend laterally between a left side 17 and a right side 19.

As illustrated in FIG. 1, front wheels 18 and rear wheels (e.g., 20) can be rotatably coupled to the frame 12. The vehicle 10 can include a steering assembly 22 that is pivotally coupled with the frame 12. The steering assembly 22 can include a set of handlebars 24, as illustrated in FIG. 1, coupled with the front wheels 18 and configured to facilitate steering of the front wheels 18. It will be appreciated that any of a variety of suitable alternative steering assembly configurations can be provided for steering wheels of a vehicle.

Figure 2:
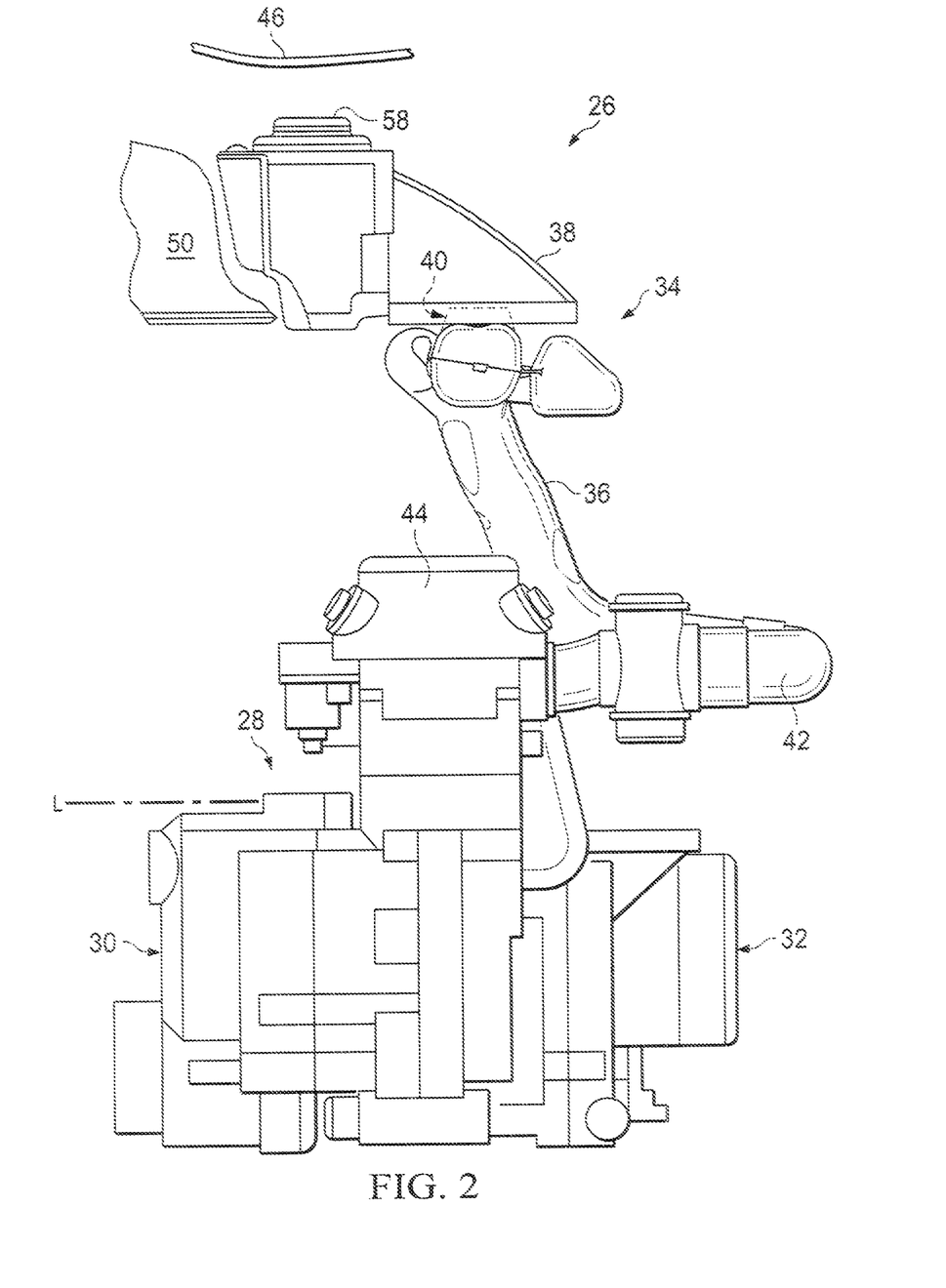
FIG. 2 is a side view depicting a vehicular engine assembly of the vehicle of FIG. 1, shown apart from the rest of the vehicle, and including a snorkel, a cover member, a support container, and a fuel tank, in accordance with one embodiment.

The vehicle 10 can include a vehicular engine assembly 26 that is supported by the frame 12, and as illustrated in FIG. 2, the vehicular engine assembly 26 can include an engine 28 that extends along the longitudinal axis L between a front end 30 and a rear end 32. The engine 28 can include a crankshaft (not shown) which in some embodiments is substantially parallel with the longitudinal axis L and in other embodiments is transverse to the longitudinal axis L. The vehicular engine assembly 26 can also include an intake assembly 34 having a snorkel 36 and a cover member 38. As illustrated in FIG. 2, the snorkel 36 can have an inlet port 40 at one end that is in fluid communication with the cover member 38. The snorkel 36 can include an outlet port (not shown) that is in fluid communication with a U-shaped coupler 42. As illustrated in FIG. 2, the U-shaped coupler 42 can be fluidly coupled to an intake manifold 44 of the engine 28 to facilitate fluid communication between the outlet port of the snorkel 36 and the intake manifold 44. The cover member 38 can be configured to receive ambient air which is then routed through the snorkel 36 and into the intake manifold 44 to facilitate combustion of fuel within the engine 28. Although the snorkel 36 is shown in FIG. 2 to include a tubular structure that is configured in such a manner to facilitate fluid communication between a cover member and an underlying engine, it will be appreciated that a snorkel can be provided in any of a variety of other configurations that facilitate routing of ambient air to an engine. It will also be appreciated that an engine can be aspirated with any of a variety of suitable alternative arrangements.

The engine 28 and the intake assembly 34 can be positioned rearwardly of the steering assembly 22. As illustrated in FIG. 1, the vehicle 10 can include a seat 46 supported by the frame 12 rearwardly of the steering assembly 22. As illustrated in FIG. 2, the seat 46 can be positioned to overlie the engine 28 and the intake assembly 34 such that the engine 28 and intake assembly 34 are provided between the legs of a rider seated upon the seat 46. The vehicle 10 can further include one or more cover panels (e.g., 48) supported by the frame 12, as shown in FIG. 1. The seat 46 can cooperate with adjacent cover panels (e.g., 48) to substantially conceal the engine 28, the intake assembly 34, and/or a fuel tank 50 (FIGS. 2-3) which can provide an aesthetically pleasing look to the vehicle 10. The seat 46 and the cover panels (e.g., 48) can also facilitate shielding of the cover member 38 and/or an opening 49 (FIGS. 2 and 4) of the snorkel 36 from passing debris, falling precipitation, debris from the wheels, or other particulates that could be harmful if introduced to an exposed intake system.

Figure 3:
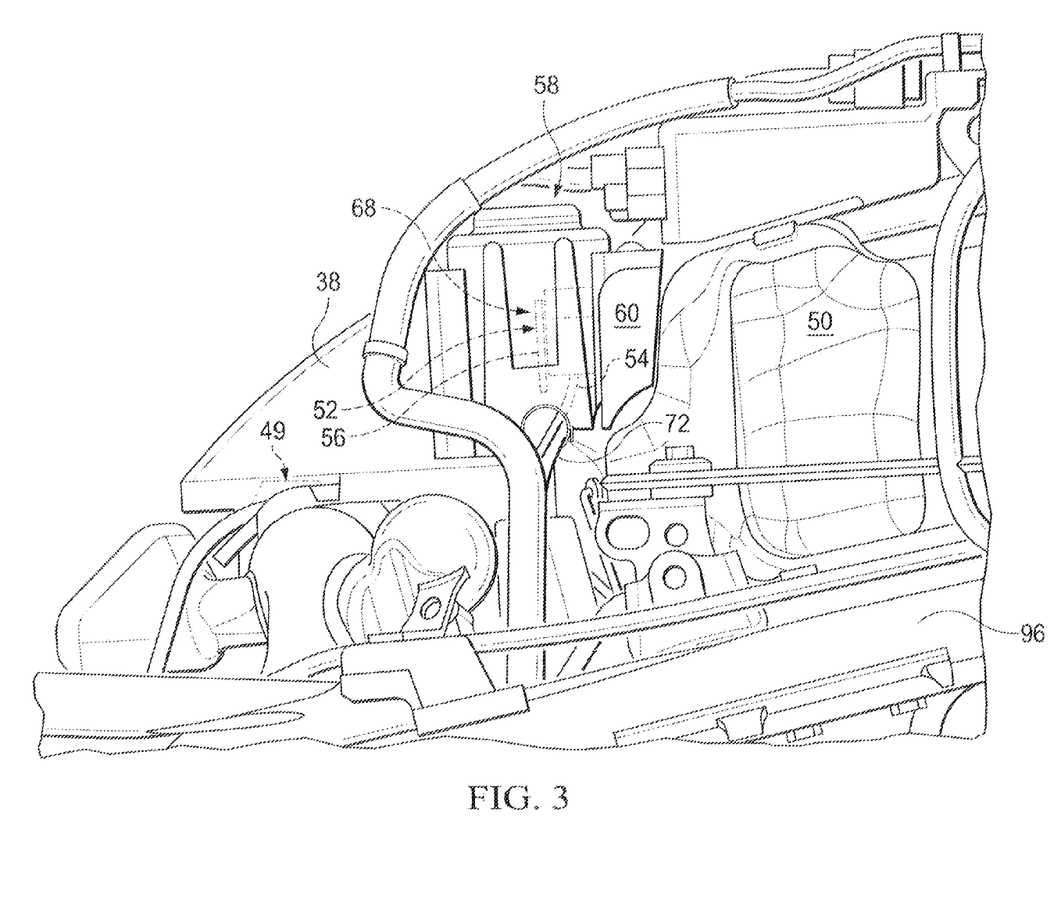
FIG. 3 is a right side perspective view depicting the snorkel, the cover member, the support container, and the fuel tank of FIG. 2 together with an electrical coupler, shown in dashed lines, and various other components of the vehicle of FIG. 1.

The vehicle 10 can include a plurality of electrical couplers 52 that are interposed between the fuel tank 50 and the cover member 38, as shown in FIG. 3. Each electrical coupler 52 can be associated with a pair of electrical conductors 54 (FIGS. 3-4) and can be configured to facilitate selective manual electrical disconnection and connection of the electrical conductors 54. In one embodiment, each electrical coupler 52 can be associated with only two conductors. In another embodiment, one or more of the electrical couplers 52 can be associated with three or more electrical conductors. One or more of the electrical couplers 52 can include a locking tab 56 (FIGS. 3-4) which can selectively engage a protrusion (not shown) to secure the electrical connection between the electrical conductors 54. The locking tab 56 can be depressed to permit disconnection of the electrical conductors 54 from the electrical coupler 52. Alternatively, an electrical coupler can include a locking horseshoe flange that is selectively removable to facilitate disconnection of one or more of electrical conductors from the electrical coupler 52. In other embodiments, an electrical coupler can include any of a variety of other coupling arrangements that facilitate selective manual electrical disconnection and connection of one or more electrical conductors.

It will be appreciated that the electrical couplers 52 can facilitate selective interconnection of components of one or more electrical systems on the vehicle 10. For example, one of the electrical couplers 52 can facilitate selective electrical connection of a starter motor to another component of the vehicle's electrical system such as a battery or a solenoid. In another example, one of the electrical couplers 52 can facilitate selective electrical connection of the vehicle's lighting system to another component of the vehicle's electrical system such as a fuse, a battery, or a solenoid.

Figure 4:
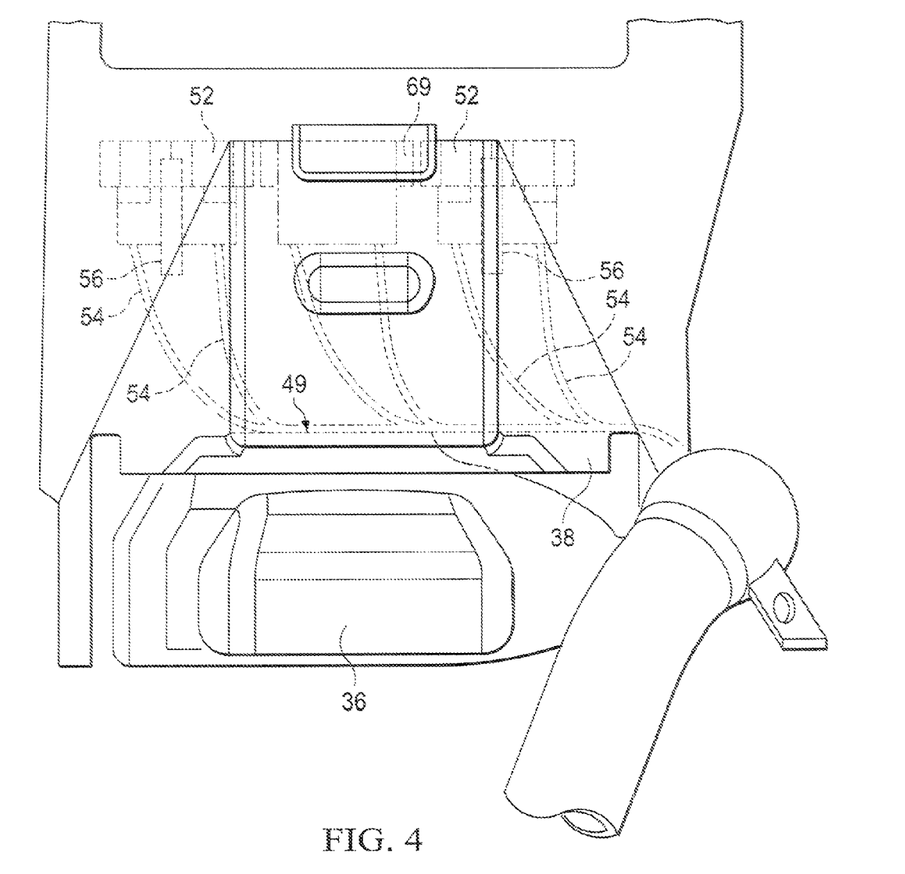
FIG. 4 is a rear view depicting the snorkel and the cover member of FIG. 2 together with a plurality of electrical couplers and an electrical control unit shown in dashed lines, with certain other components removed for clarity of illustration.
Figure 5:
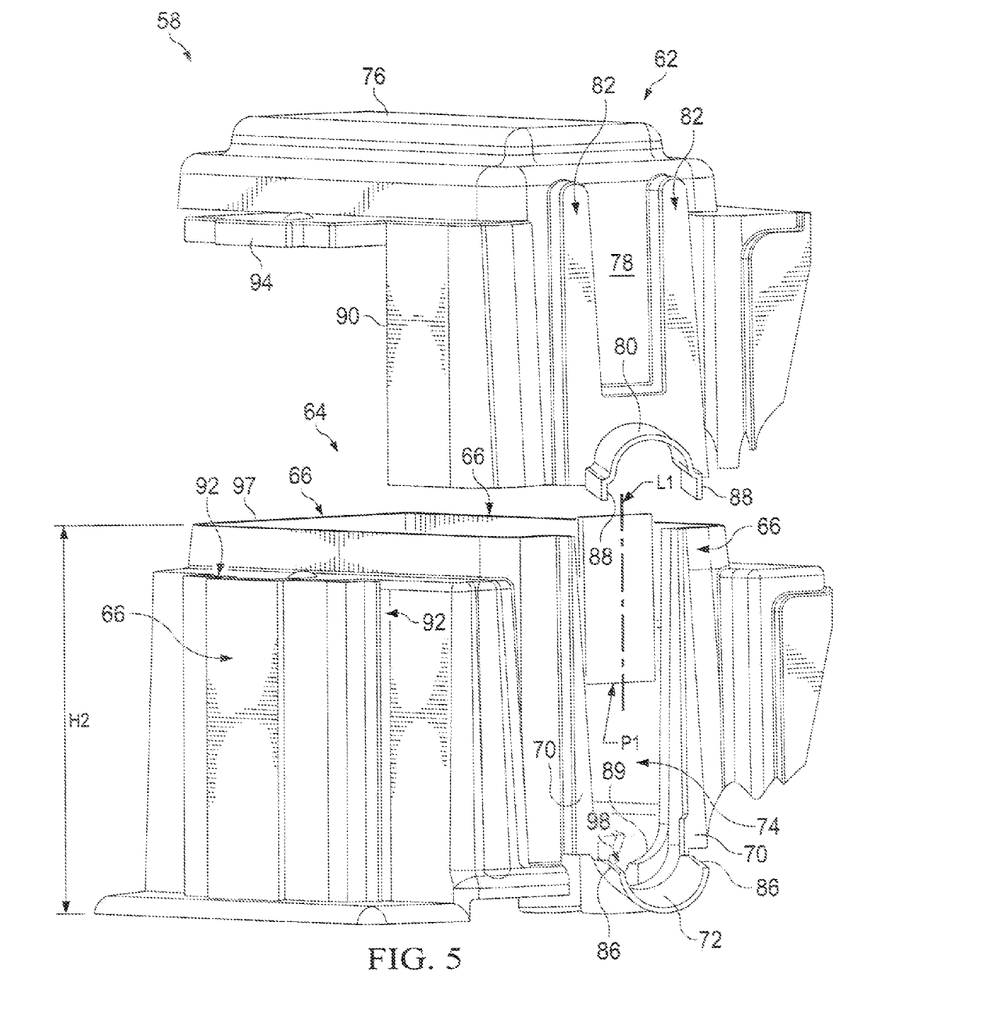
FIG. 5 is an exploded perspective view depicting a lid and a base of the support container of FIG. 2 and shown apart from the rest of the vehicular engine assembly.
Figure 6:
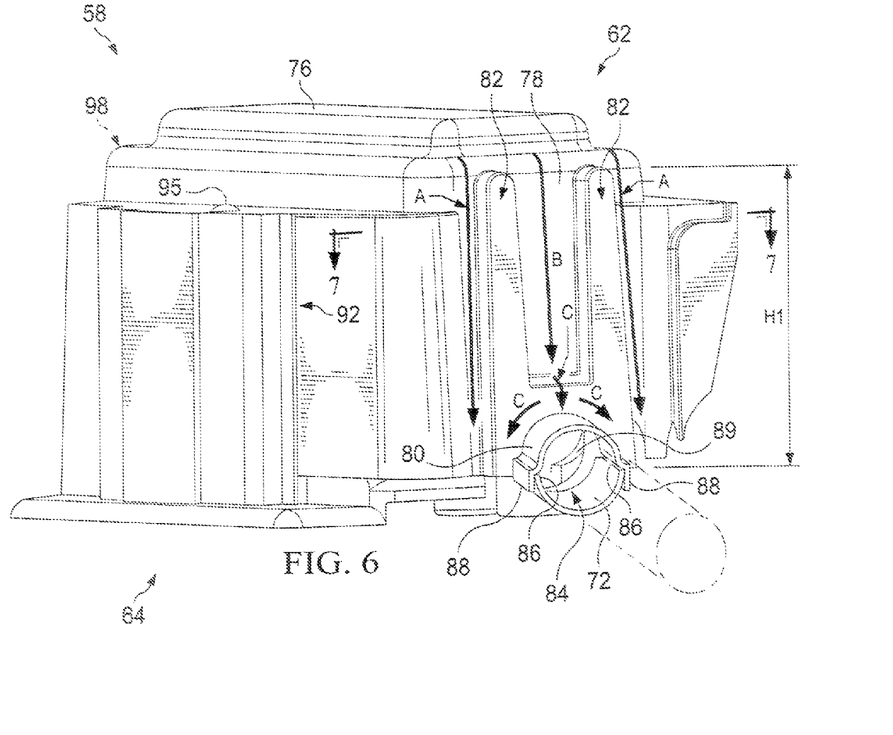
FIG. 6 is a perspective view depicting the support container of FIG. 5 but with the lid shown installed on the base and cooperating to define a conduit for a wire harness shown in dashed lines and with arrows depicting directions of water flow.
Figure 7:
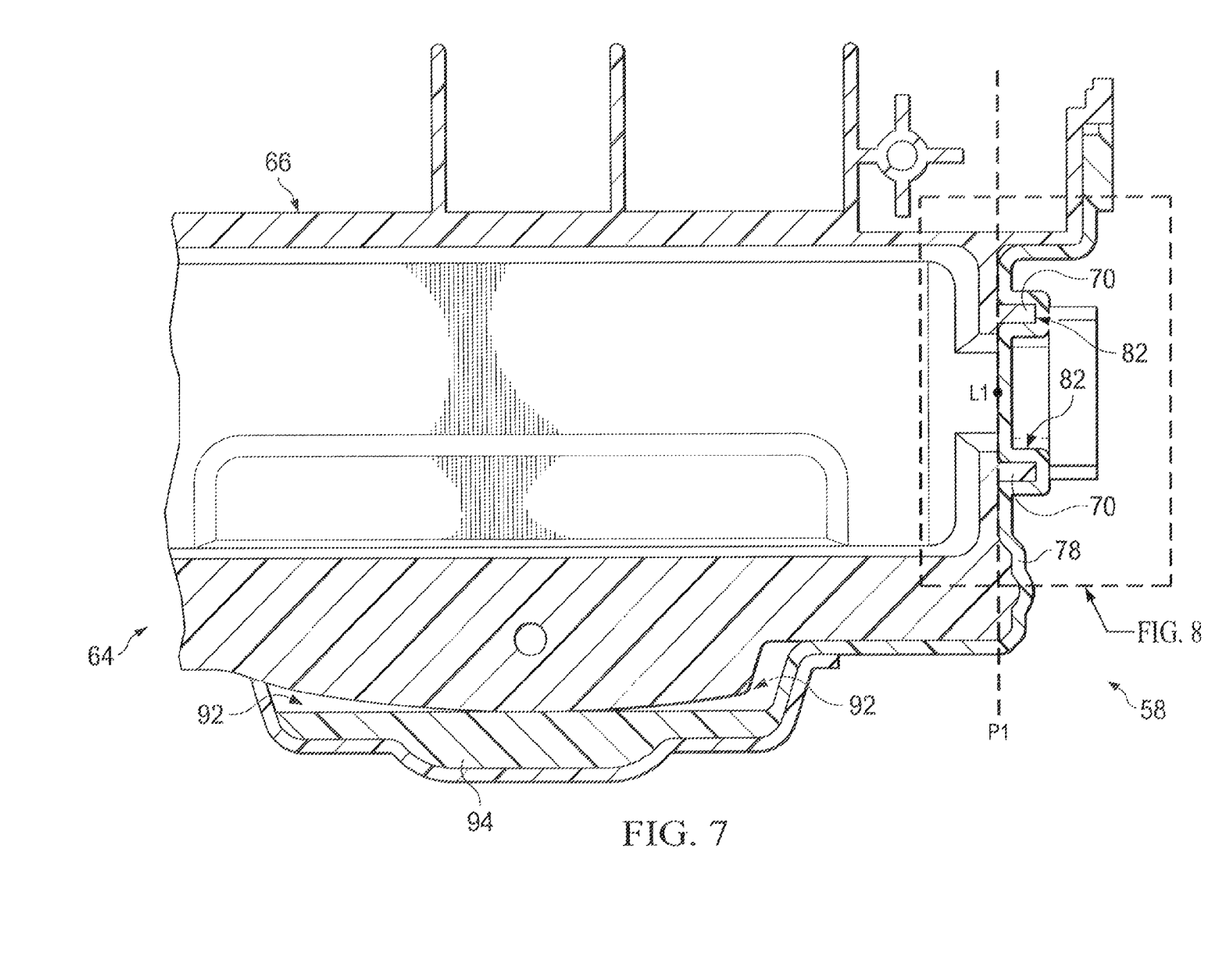
FIG. 7 is a cross-sectional view taken along line 7-7 of FIG. 6.

As illustrated in FIG. 3, the electrical couplers 52 can be provided within a support container 58 that can be supported with respect to the frame 12 by a support bracket 60. As illustrated in FIGS. 5-6, the support container 58 can include a lid 62 and a base 64, and the base 64 can include a plurality of base walls 66 that can cooperate to at least partially define a receptacle 68. The electrical couplers 52 can be disposed entirely (or substantially entirely) within the receptacle 68, as shown in FIG. 3. More particularly, the electrical couplers 52 can be releasably coupled to an inner portion of one of the base walls 66 by a stay arrangement (not shown), releasable fasteners (not shown), or any of a variety of suitable alternative releasable coupling arrangements. It will be appreciated that any of a variety of other electrical couplers or other electrical components can be collocated with the electrical couplers 52 inside of the support container 58. For example, as illustrated in FIG. 4, an engine control unit 69 can be coupled to the inner portion of one of the base walls 66 and provided between the electrical couplers 52. It will also be appreciated that while the support container 58 in FIGS. 5-7 is shown to include a plurality of base walls 66 that are arranged such that the base 64 is substantially rectangular shaped, a base can be provided in any of a variety of other suitable configurations such as having one base wall arranged such that the base is substantially cylindrically shaped.

When the lid 62 is installed on the base 64, the lid 62 can overlie the base 64 and can cooperate with the base 64 to substantially conceal the electrical couplers 52. The electrical couplers 52 can be selectively accessed by removing the lid 62 from the base 64. For example, once the lid 64 has been removed, the electrical couplers 52 can be accessed, released from the inner portion of the base wall 66, and withdrawn slightly from the base 64. The locking tab 56 of each electrical coupler 52 can then be manually actuated to facilitate electrical disconnection of the electrical conductors 54 from the electrical coupler 52.

In some embodiments, and as illustrated in FIG. 3, each of the cover member 38, the electrical couplers 52, and the fuel tank 50 can be disposed between left and right frame rails (right frame rail 96 shown). And as illustrated in FIG. 2, the support container 58 can be interposed between the cover member 38 and the fuel tank 50 such that the support container 58 serves as a front wall for the cover member 38 and at least partially obstructs debris that might otherwise be drawn into the snorkel 36. For example, during operation of the vehicle 10, ambient air can flow from the front end 14 of the vehicle 10 through the cover member 38 and to the snorkel 36. The support container 58 can disrupt the flow of air directly into the cover member 38 enough to obstruct debris from entering the intake assembly 34.

As illustrated in FIG. 5, the base 64 can include a pair of substantially vertical, elongated flanges 70 and a lower flange 72. In one embodiment, the base walls 66 and the pair of substantially vertical, elongated flanges 70 can be formed together in a unitary, one-piece construction. The pair of substantially vertical, elongated flanges 70 can cooperate with the lower flange 72 to define a slot 74. When the lid 62 is not installed on the base 64, the slot 74 can provide access to the lower flange 72 from above the base 64. As such, the electrical conductors 54 can be passed through the slot 74 during installation and/or removal of the electrical conductors 54 into/from the base 64. As illustrated in FIG. 5, the slot 74 can define a centerline L1 that resides in an imaginary plane P1. In one embodiment, the centerline L1 can bisect the slot 74 and the plane P1 can extend through the portions of the base 64 that define the slot 74 (e.g., the portions of the base wall 66 immediately adjacent to the substantially vertical, elongated flanges 70). In one embodiment, each of the substantially vertical, elongated flanges 70 can extend away from the base wall 66, the receptacle 68, and the imaginary plane P1 in the same direction (e.g., in substantially the same direction as the lower flange 72).

Figure 8:
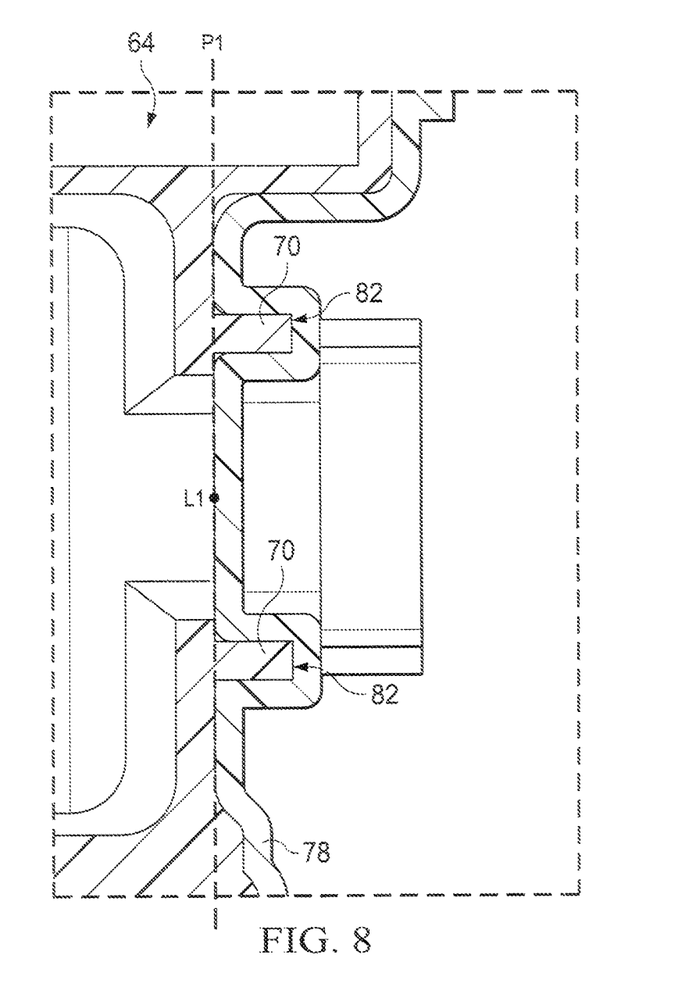
FIG. 8 is an enlarged view of an encircled portion of FIG. 7.

As shown in FIGS. 5-6, the lid 62 can include an upper portion 76, a side wall 78, and an upper flange 80, and in one embodiment, the upper portion 76, the side wall 78, and the upper flange 80 can be formed together in a unitary, one-piece construction. The side wall 78 can extend substantially downwardly from the upper portion 76, and as illustrated in FIGS. 5-8, the side wall 78 can define a pair of substantially vertical, elongated channels 82. When the lid 62 is installed on the base 64, the side wall 78 can substantially conceal the slot 74. Furthermore, and as shown in FIGS. 6-8, when the lid is installed on the base 64, the pair of substantially vertical, elongated flanges 70 can nest extensively within the pair of substantially vertical, elongated channels 82 of the lid 62. The pair of substantially vertical, elongated flanges 70 and the pair of substantially vertical, elongated channels 82 are shown to be substantially tapered. As such, the substantially vertical, elongated flanges 70 can be seated into the substantially vertical, elongated channels 82 of the lid 62 once the lid 62 is fully installed on the base 64. As such, the substantially vertical, elongated flanges 70 can mate with the side wall 78 in an interference fit. It will be appreciated that although the side wall 78 is shown to be a partial side wall, such that it only covers a portion of the base 64, it will be appreciated that in other embodiments, a lid can have any of a variety of side wall arrangements such as a plurality of side walls and/or a continuous side wall, for example.

In one embodiment, the electrical conductors 54 can be routed out of the receptacle 68 through one or more openings in the support container 58. For example, the lower flange 72 of the base 64 and the upper flange 80 of the lid 62 can cooperate with one another to form a conduit 84 (FIG. 6) for the receptacle 68 (e.g., to allow the electrical conductors 54 to be routed from the support container 58). It will be appreciated that in some embodiments, the electrical conductors 54 can be clustered together as a wiring harness such that they can be routed together through the conduit 84. As illustrated in FIGS. 5-6, each of the lower flange 72 and the upper flange 80 can be substantially semi-cylindrically shaped and include a respective pair of circumferential ends (e.g., 86, 88). The circumferential ends 88 of the upper flange 80 can extend over the circumferential ends 86 of the lower flange 72 when the lid 62 is installed on the base 64. The lower flange 72 can include a pair of projections (e.g., 89) which can facilitate grasping of a wiring harness when the lid 62 is installed on the base 64.

As illustrated in FIGS. 7-8, the side wall 78 of the lid 62 can abut at least a portion of the base wall 66 when the lid 62 is installed on the base 64. In embodiments where the lid 62 includes more than one side wall 78, each side wall 78 can abut at least a portion of a respective base wall 66. Furthermore, when the lid 62 is installed on the base 64, the side wall 78 can overlap the base wall 66 along a vertical distance H1 (FIG. 6) that is at least one half of an overall height H2 (FIG. 5) of the base 64. In one embodiment, as shown in FIGS. 5-7, the side wall 78 can include a peripheral edge 90 and the base 64 can define a groove 92. In one embodiment, the groove 92 can extend along the base wall 64 and underneath a lid flange 94 of the lid 62. In such an embodiment, as illustrated in FIGS. 6 and 7, when the lid 62 is installed on the base 64, each of the peripheral edge 90 and the lid flange 94 can extend into the groove 92. While the lid 62 is shown in FIGS. 5-7 to include one side wall 78 having one peripheral edge 90 and lid flange 94 disposed in the groove 92, it will be appreciated that a support container can include any of a variety of peripheral edges and/or flanges that are disposed into a groove of a base. The lid 62 can be releasably secured to the base 64 with fasteners (e.g., 95 in FIG. 6), clips (not shown), or any of a variety of other suitable alternative releasable fastening arrangements. A sealing arrangement (not shown) can also be provided between an upper edge 97 (FIG. 5) of the base 64 and the lid 62 to seal the upper perimeter of the support container 58.

When water is introduced onto the support container 58, the sealing arrangement (not shown) can help prevent the water (e.g., the water provided onto the portions of the lid 62 and base adjacent to the side wall 78) from entering the receptacle 68. In addition, the base wall 66 and the side wall 78 can cooperate to route water away from the slot 74 and the conduit 84 and thus limit the introduction of water into the receptacle 68 from between the base wall 66 and the side wall 78 as well as through the conduit 84. For example, when water is provided onto the side wall 78, the substantially vertical, elongated channels 82 can define different flow paths for the water. Water that is provided along the outside vertical edges of the substantially vertical, elongated channels 82 can be routed away from the conduit 84 (as indicated by arrows A in FIG. 6). Any water that is provided on the outer surface of the substantially vertical, elongated channels 82 or between the substantially vertical, elongated channels 82 (as indicated by arrow B in FIG. 6) can be routed onto the upper flange 80 (as indicated by arrows C in FIG. 6). Since the circumferential ends 88 of the upper flange 80 overlies the circumferential ends 86 of the lower flange 72, water that contacts the upper flange 80 is routed away from the conduit 84. Any water that might be inadvertently introduced between the base wall 66 and the side wall 78 (e.g., due to migration/creep) can be prevented from entering the receptacle 68 by the interference fit between the substantially vertical, elongated flanges 70 and the side wall 78. Similarly, any water that might inadvertently be introduced between the peripheral edge 90 and the base 64 can be carried downwardly and away from the receptacle 68. As such, any water that might be introduced into the conduit 84 (e.g., through migration, splashing, etc.) can still be routed away from the receptacle 68 thus preventing water from being retained (e.g., pooling) on the support container 58. In one embodiment, as illustrated in FIG. 5, the pair of projections (e.g., 89) can define a groove 98 between the receptacle 68 and the lower flange 72. When a wiring harness is clamped between the lower and upper flanges 72, 80, the groove can permit water that is introduced into the receptacle 68 to flow out of the receptacle 68 and without obstruction by the wiring harness. In some embodiments, it will be appreciated that the support container 58 might not include a pair of projections or a groove.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A support container comprising:
   a base comprising:
      a base wall that at least partially defines a receptacle;
      a pair of elongated flanges, the elongated flanges being substantially vertical; and
      a lower flange that cooperates with the pair of elongated flanges to define a slot; and
   a lid comprising:
      an upper portion;
      a side wall extending substantially downwardly from the upper portion, the side wall defining a pair of elongated channels, the elongated channels being substantially vertical; and
      an upper flange; wherein:
   the slot defines a centerline that resides in an imaginary plane;
   each of the elongated flanges extends away from the base wall, the receptacle, and the imaginary plane in substantially the same direction; and
   when the lid is installed on the base, the side wall substantially covers the slot, the pair of elongated flanges of the base nests extensively within the pair of elongated channels of the side wall of the lid, and the lower flange of the base and the upper flange of the base of the lid cooperate with one another to define a conduit for the receptacle.

2. The support container of claim 1 wherein each of the upper and lower flanges is substantially semi-cylindrically shaped and comprises a respective pair of circumferential ends, and wherein the circumferential ends of the upper flange extend over the circumferential ends of the lower flange when the lid is installed on the base.

3. The support container of claim 1 wherein the lid is releasably secured to the base with fasteners.

4. The support container of claim 3 wherein the side wall of the lid abuts at least a portion of the base wall when the lid is installed on the base.

5. The support container of claim 4 wherein the side wall includes a peripheral edge and the base wall defines a groove, and the peripheral edge extends into the groove when the lid is installed on the base.

6. The support container of claim 1 wherein the lid further comprises a lid flange extending substantially downwardly from the upper portion and configured for selective engagement with the base wall when the lid is installed on the base.

7. The support container of claim 1 wherein, when the lid is installed on the base, the side wall overlaps the base wall along a vertical distance that is at least one half of the overall height of the base.

8. The support container of claim 1 wherein the upper portion, the side wall, and the upper flange are formed together in a unitary, one-piece construction.

9. The support container of claim 1 wherein the elongated flanges are tapered and mate with the side wall in an interference fit.

10. A support container comprising:
    a base comprising:
       a base wall that at least partially defines a receptacle;
       a pair of elongated flanges, the elongated flanges being substantially vertical; and
       a lower flange that cooperates with the pair of elongated flanges to define a slot; and
    a lid comprising:
       an upper portion;
       a side wall extending substantially downwardly from the upper portion, the side wall defining a pair of elongated channels, the elongated channels being substantially vertical; and
       an upper flange; wherein:
    the slot defines a centerline that resides in an imaginary plane;
    each of the elongated flanges extends away from the base wall, the receptacle, and the imaginary plane in substantially the same direction;
    when the lid is installed on the base, the side wall substantially covers the slot, the pair of elongated flanges of the base nests extensively within the pair of elongated channels of the side wall of the lid;
    the side wall of the lid abuts the base wall, the side wall including a peripheral edge and the base wall defines a groove, and the peripheral edge extends into the groove when the lid is installed on the base;
    the lid further comprises a lid flange extending substantially downwardly from the upper portion and configured for selective engagement with the base wall when the lid is installed on the base; and
    the lower flange and the upper flange of the lid cooperate with one another to define a conduit for the receptacle, each of the upper and lower flanges is substantially semi-cylindrically shaped and comprises a respective pair of circumferential ends, and wherein the circumferential ends of the upper flange extend over the circumferential ends of the lower flange when the lid is installed on the base.

11. A vehicle comprising:
    a frame including a support bracket;

a base coupled to the support bracket and comprising:
- a base wall that at least partially defines a receptacle;
- a pair of elongated flanges, the elongated flanges being substantially vertical; and
- a lower flange that cooperates with the pair of elongated flanges to define a slot; and a lid comprising:
- an upper portion;
- a side wall extending substantially downwardly from the upper portion, the side wall defining a pair of elongated channels, the elongated channels being substantially vertical; and
- an upper flange; wherein:

the slot defines a centerline resides in an imaginary plane;

each of the elongated flanges extends away from the base wall and the receptacle; and when the lid is installed on the base, the side wall substantially covers the slot, the pair of elongated flanges of the base nests extensively within the pair of elongated channels of the side wall of the lid, and the lower flange and the upper flange of the lid cooperate with one another to define a conduit for the receptacle.

12. The vehicle of claim 11 wherein each of the upper and lower flanges is substantially semi-cylindrically shaped and comprises a respective pair of circumferential ends, and wherein the circumferential ends of the upper flange extend over the circumferential ends of the lower flange when the lid is installed on the base.

13. The vehicle of claim 11 wherein the lid is releasably secured to the base with fasteners.

14. The vehicle of claim 13 wherein the side wall of the lid abuts at least a portion of the base wall when the lid is installed on the base.

15. The vehicle of claim 14 wherein the side wall includes a peripheral edge and the base wall defines a groove, and the peripheral edge extends into the groove when the lid is installed on the base.

16. The vehicle of claim 11 wherein each of the elongated flanges extends away from the base wall, the receptacle, and the imaginary plane in the same direction.

17. The vehicle of claim 11 wherein the lid further comprises a lid flange extending substantially downwardly from the upper portion and configured for selective engagement with the base wall when the lid is installed on the base.

18. The vehicle of claim 17 wherein, when the lid is installed on the base, the side wall overlaps the base wall along a vertical distance that is at least one half of the overall height of the base.

19. The vehicle of claim 11 wherein the upper portion, the side wall, and the upper flange are formed together in a unitary, one-piece construction.

20. The vehicle of claim 11 wherein the elongated flanges are tapered and mate with the side wall in an interference fit.

\* \* \* \* \*

UNITED STATES PATENT AND TRADEMARK OFFICE
CERTIFICATE OF CORRECTION

PATENT NO.        : 8,835,759 B1
APPLICATION NO.   : 13/803169
DATED             : September 16, 2014
INVENTOR(S)       : Edgar Arturo Escobar et al.

Page 1 of 1

It is certified that error appears in the above-identified patent and that said Letters Patent is hereby corrected as shown below:

In the Claims

Claim 1, column 7, line 63, change "flange of the base of the lid" to --flange of the lid--; and
Claim 11, column 9, line 20, change "lower flange and" to --lower flange of the base and--.

Signed and Sealed this
Tenth Day of February, 2015

Michelle K. Lee
*Deputy Director of the United States Patent and Trademark Office*